Figure 6:
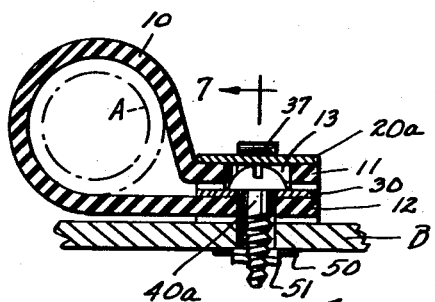

March 15, 1949.    G. A. TINNERMAN    2,464,620
FASTENING DEVICE
Filed June 19, 1944    2 Sheets-Sheet 1
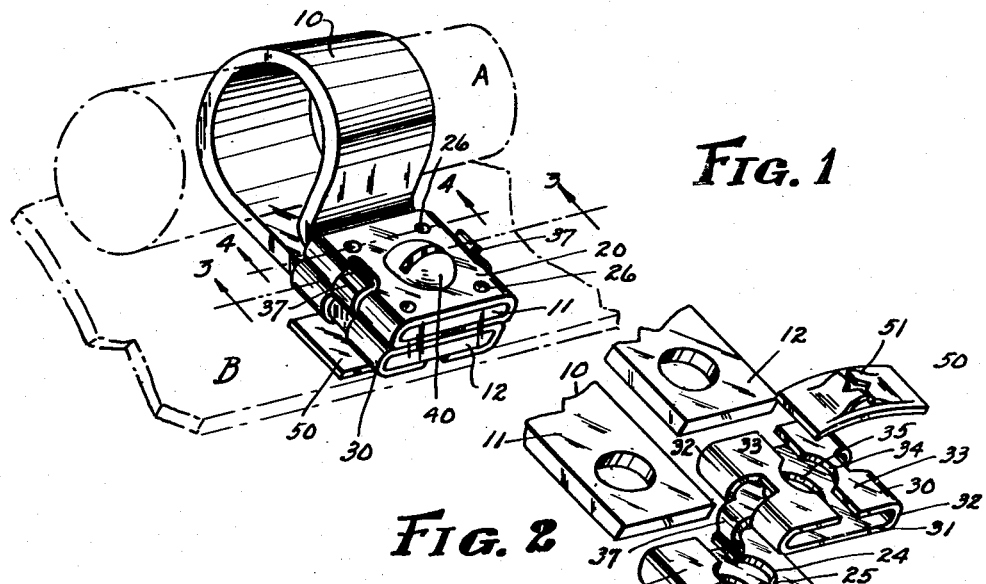
Fig. 1
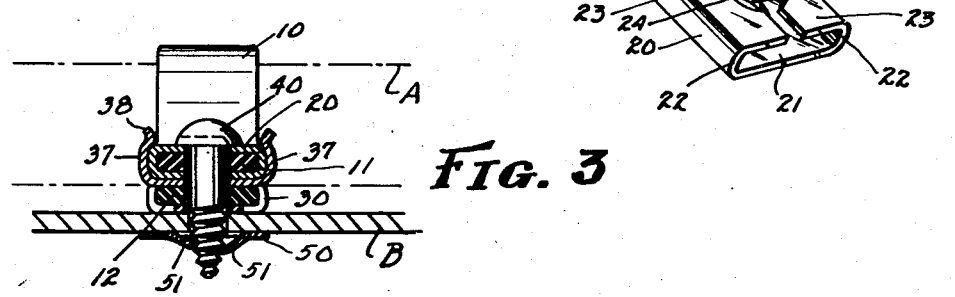
Fig. 2
Fig. 3
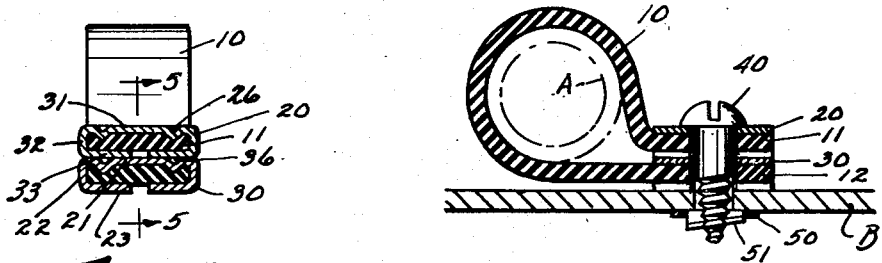
Fig. 4    Fig. 5
INVENTOR.
GEORGE A. TINNERMAN
BY Bates, Teare, & McKean
ATTORNEYS March 15, 1949. G. A. TINNERMAN 2,464,620
FASTENING DEVICE
Filed June 19, 1944 2 Sheets-Sheet 2

INVENTOR.
GEORGE A. TINNERMAN
BY
Bates, Teare & McBean
ATTORNEYS

Patented Mar. 15, 1949

2,464,620

UNITED STATES PATENT OFFICE 2,464,620

FASTENING DEVICE

George A. Tinnerman, Cleveland, Ohio, assignor to Tinnerman Products, Inc., Cleveland, Ohio, a corporation of Ohio Application June 19, 1944, Serial No. 540,913

11 Claims. (Cl. 248—74)

This invention relates to a fastening device comprising a flexible strap or loop and a pair of members adapted to be mounted respectively on the end portions of the loop and coact with each other by snap action to lock the loop closed. One of the objects of the invention is to provide the coacting members of such form that they be effectively attached to the strap and will readily coact with each other by snap action when it is desired to close the strap, and will allow separation by a suitable force, whenever desired. Another object of the invention is to form the members with provision for the ready mounting by an attaching screw, which may lock one or both members, with the associated portion of the loop, to a support.

Several embodiments of my invention are illustrated in the drawings hereof and are hereinafter described and essential novel features are set out in the claims.

Figure 7:
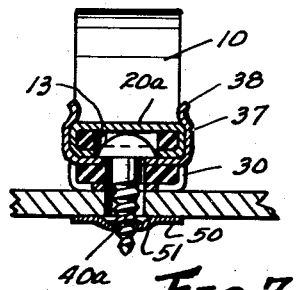
Figure 8:
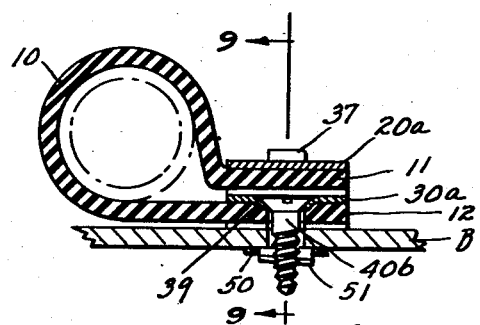
Figure 9:
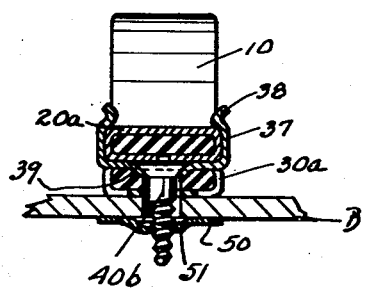
Figure 10:
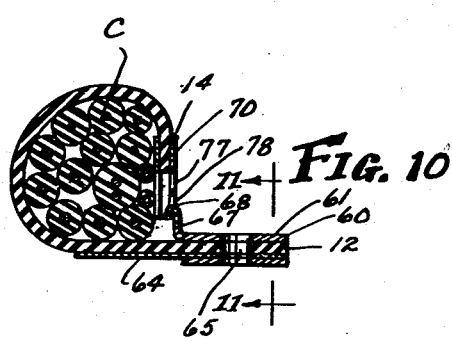
Figure 11:
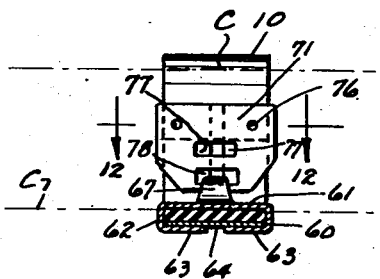
Figure 12:
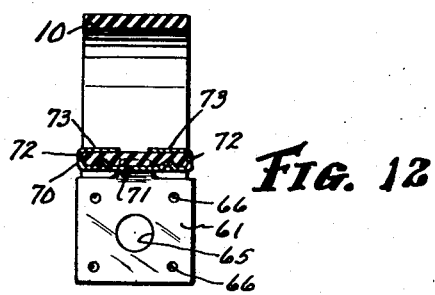

In the drawings, Fig. 1 is a perspective of one form of my fastening device in a position it occupies when attached to a support and embracing a member to be held; Fig. 2 is a bottom perspective of various parts of the fastening device separated from each other; Fig. 3 is a cross section in a plane indicated by the line 3—3 in Fig. 1; Fig. 4 is a cross section through the device in a plane indicated by the line 4—4 on Fig. 1; Fig. 5 is a longitudinal section through this embodiment in the central plane indicated by the line 5—5 in Fig. 4; Fig. 6 is a sectional side elevation of another embodiment of this fastening device; Fig. 7 is a vertical section on the line 7—7 on Fig. 6; Fig. 8 is a longitudinal central section of another embodiment of the invention; Fig. 9 is a vertical section on the line 9—9 on Fig. 8; Fig. 10 is a longitudinal central section of a still different embodiment of the invention; Fig. 11 is a vertical section of the line 11—11 on Fig. 10; Fig. 12 is a horizontal section of the same embodiment on the line 12—12 on Fig. 11.

Referring first to the embodiment of Figs. 1 to 5, inclusive, 10 indicates a strap of any suitable flexible yielding material and 20 and 30 two coacting end members mounted on the ends of the strap respectively. The strap is usually of non-metallic composition and thus may embrace, for instance, a metallic member without electric connection therewith. I have found that Neoprene is a satisfactory substance of which to make the strap.

The fastening member 20 is a strip of resilient sheet material doubled on itself from each edge to embrace and nearly surround one end portion as 11 of the strap 10. The doubled member is of the form shown comprising an intermediate top portion 21, two return bend edge portions 22 and two bottom portions 23. These bottom portions may be separated a short distance, as shown in Fig. 2. They are centrally provided with enlargements 24 to make an opening for the fastening screw. A registering opening 25 is also made in the top portion 21. This fastening member snugly embraces the strap end and may be prevented from shifting longitudinally thereon by indentations 26 made in the member after mounting.

The coacting member 30, which embraces the other end of the strap, as the end portion 12 in Figs. 1 and 2, is formed with a top portion 31, edge return bends 32 and bottom portions 33 and openings 34 and 35 similar to that of the member 20. Additionally, the member 30 has a pair of tongues 37 cut out from the intermediate region of the two bottom members 33 and the adjacent return bend edges 32. These tongues are bent upwardly, that is beyond the top plane 31, and curved inwardly and at their extreme edges 38 flared outwardly, the tongues being thus adapted to embrace snugly the member 20, as clearly shown in Figs. 1 and 3. The bottom member 30 may be locked to the projecting end 12 of the strap by indentations 36, Fig. 4, similar to those of the top member.

It will be seen that the two members are readily adapted for mounting and anchoring on the projected ends of the loop. When it is desired to close the loop the top member 20 is simply placed against the outwardly flaring portions 38 of the bottom member and pressed downwardly, springing the tongues 37 outwardly until the top member is seated against the bottom member when the reacting tongues will snugly embrace the top member. This gives a snap action to the device, enabling it to be readily closed whenever desired. Likewise it may be snapped open by the insertion of a blade between the two members and a slight prying action.

The registering central openings in the members 20 and 30 provide for the passage of a fastening screw or bolt as, for instance, the screw 40 shown in Figs. 1, 3 and 5, which may engage a suitable nut. The nut shown is a sheet metal member 50 having a pair of obliquely arranged spring tongues 51 separated at their ends and warped to provide a thread-engager.

In Figs. 1, 3 and 5, I have indicated the strap as passing around a suitable conduit A and the screw as anchoring the device to the suitable supporting plate B. It will be seen that when thus mounted the member A is effectively held to the support B by the embracing yielding strap, which provides an effective insulating support. The tubular conduit A is, of course, shown as merely illustrative of any member which may be embraced by the strap. The strap is simply looped around such member A, with the end fittings 20 and 30 separated and the fitting 20 is then pressed into the fitting 30 closing the loop about the member A. Then the fastening is ready for attachment by the insertion of the screw 40.

Figs. 6 and 7 illustrate another embodiment of my invention, wherein the bottom member 30 of the coacting fastener is identical with that heretofore described. The top member 20a is similar to the member 20 except that it has no central bolt opening corresponding to the opening 25 of the member 20. In this case the fastening screw 40a passes merely through the lower member 30 and the support B into the nut 50. The head of the screw engages the top of the lower member and locks it, and that end of the fastening loop, to the support. The other member 20a in this instance is held merely by the snapping tongues 37 of the bottom member, the opening 13 through the end portion 12 of the loop being large enough to receive freely the head of the screw.

It will be seen that in the embodiment of Figs. 6 and 7, one end of the loop may be firmly secured to the support and the other end thereafter snapped into engagement or out of engagement with the attached member.

Figs. 8 and 9 illustrate a slightly different embodiment of my invention from that just described. Here the bottom member 30a is formed with a downwardly directed countersunk flange 39 to receive the countersunk head of the fastening screw 40b. This screw therefore in passing through the support B and engaging the nut 50 firmly attaches the one end of the loop to the support by means providing a flush surface at the top of the bottom member 30. The top member in this case, 20a, is the same as that shown in Fig. 6 but the end portion 11 of the loop may be made without any opening as the head of the fastening screw is entirely below it. This device is attached to the support and closed and openind by snap action, the same as the embodiment of Figs. 6 and 7.

Figs. 10, 11 and 12, show a different embodiment of the invention, which is very suitable for embracing and holding a loop of electric wires indicated at C in Fig. 10 and adapted to clamp the same to varying degrees. This enables a tight harness of the wires so their number may be varied in repairing or additional installation. In this instance, the loop 10 has one substantially tangential end portion 12 as heretofore, but the other end portion, instead of laying alongside of the portion 12, projects toward it as shown at 14. The tangential arm of the loop carries one member 60 of the fastening combination, which coacts variously with the other member 70, secured to the end portion of 14.

As shown, the fastening member 60 has a top portion 61, return-bend edges 62 and bottom portions 63, so that it may embrace the strap arm 12. I preferably reinforce that arm on its underside by a plate 64. Suitable registering bolt openings are provided through the top layer 61; the arm 12; the reinforcing plate, and the bottom portion by central enlargement of the bottom space, all as indicated by the general character 65 in Fig. 10. Suitable indentations 66 in the top plate 61 firmly lock this fastening member to the flexible loop. A tongue 67 is formed at the inner edge of the top plate 61 and extends upwardly therefrom and is then bent downwardly into a hook 68, Fig. 10, to coact with the other member, 70, as about to be described.

The member 70 has an intermediate portion 71, return-bend edges 72 and final portions 73, so that the device may readily embrace the end portion 14 of the strap and be effectively locked in this position by indentations 76. The member 70 is provided with a plurality of openings 77, 78, which may be occupied by the hooked end 68 of the tongue 67.

Figs. 10 and 11 show the hook 68 engaging the opening 78 in the clip 70 and as thus binding a loop of wires C within the loop. To open the loop and free the wires it is merely necessary to press the member 70 downwardly and inwardly toward the loop arm 12 to free the member from the hook. To make a more constricted embrace of the articles to be held, the member 70 is pressed further inwardly until the hook 68 engages the upper opening 77 of the fastening. I have shown merely two openings, which are to be taken as an indication of any convenient number of more than one.

With such a construction, as shown in Figs. 10, 11 and 12, the device may be fixedly mounted on a suitable support and is then ready for the reception of whatever is to be held, as, for instance, a bundle of wires, and then may be snapped tight shut. If it is necessary to remove a wire for repairs (as frequently happens in airplane work) the release of the member 70 from the hook immediately opens the loop and after the injured wire is repaired, or a substitute supplied, the device may be readily snapped shut. In the original installation, or following the repairs, the latitude allowed by the multiple anchorages for the fastening hook provides for the ready embracing of the wires with the snugness desired.

Reference is made to my divisional application Ser. No. 653,599, filed March 11, 1946, for claims directed particularly to the species illustrated in Fig. 10, 11 and 12 hereof.

I claim:

1. The combination of a flexible loop, a fastening member secured to one arm of the loop, a fastening member secured to the other arm of the loop, at least one of the fastening members having a pair of projecting tongues adapted to frictionally embrace the other member by snap action to hold the members interlocked.

2. The combination of a non-metallic flexible loop, a fastening member embracing one arm of the loop, a fastening member embracing the other arm of the loop, at least one of the fastening members having a pair of projecting tongues adapted to frictionally engage opposite edges of the other member and having inwardly directed portions to overhang such other member.

3. A fastening device comprising a flexible loop having separate extending end arms, a pair of fastening members each embracing one of the arms, one of the fastening members having an opening for the passage of a fastening screw, at least one of the fastening members having a pair of tongues partially severed from it and bent away from it adjacent its edges and formed to engage the other fastening member by snap action.

4. A fastening device comprising a flexible loop, fastening members each embracing a projecting arm of the loop, one of the fastening members having a pair of edge tongues partially severed from it and bent away from it to engage the edges of the other fastening member, the two fastening members and the embraced arms of the loop being provided with registering openings for the passage of an attaching member extending through both fastening members.

5. A fastening device comprising a flexible non-metallic loop, sheet metal fastening members, each doubled on itself to provide a top, two return bent edges, and two bottom portions and each embracing a projecting arm of the loop, one of the fastening members having a pair of edge tongues partially severed from it and bent away from it and inwardly curved to engage opposite edges of the other fastening member, the two fastening members and the embraced arms of the loop being provided with registering openings for the passage of an attaching member extending through both fastening members.

6. In a fastener, the combination of a flexible loop, a fastening member doubled on itself to provide an intermediate portion, two edge portions and two extreme portions to embrace an arm of the loop, means on the fastening member projecting away from the intermediate portion thereof in a direction substantially opposite to that of the edge portions and another fastening member adapted to be secured to the other arm of the loop and be engaged by said projecting means.

7. In a fastener, the combination of a flexible loop, a fastening member doubled on itself to provide an intermediate portion, two edge portions and two extreme portions adapted to embrace an arm of the loop, a second fastening member doubled on itself to provide an intermediate portion, two edge portions and two extreme portions adapted to embrace the other end arm of the loop, one of said fastening members having a pair of projecting tongues adapted to embrace the other member by snap action to hold the loop closed.

8. In a fastening device, the combination of a loop of flexible material having projecting end arms, a pair of fastening members each embracing a projecting arm of the loop, there being registering openings through one of the fastening members and through the embraced arm of the loop to provide for the passage of a fastening screw, one of the members having a pair of tongues projecting toward the other member and adapted to frictionally embrace it to hold the loop closed.

9. A fastening device comprising a flexible loop having separate end portions, two fastening devices mounted respectively on said end portions, one of the fastening devices having a pair of projecting arms spaced apart and adapted to embrace the other fastening device by snap action.

10. The combination of a loop having projecting end arms, a fastening device embracing one of the end arms having an opening registering with an opening in the arm for the passage of a screw with its head above the fastener and a coacting fastening device mounted on the other arm which arm has an opening through it large enough to receive the head of a screw, and means on one of the fastening members coacting with the other by a snap action to hold the two together.

11. The combination of a flexible loop having projecting end arms, a pair of coacting fastening arms embracing said arms respectively, one of the fastening members having a bolt opening, a countersunk recess about the opening whereby a countersunk screw may have its head occupying the countersunk recess and passing through the loop arm and anchoring the same to a support, one of said fastening members having spring means coacting with the other by a snap action to hold the two together.

GEORGE A. TINNERMAN.

REFERENCES CITED

The following references are of record in the file of this patent:

UNITED STATES PATENTS

| Number | Name | Date |
| --- | --- | --- |
| 2,059,825 | Talbott | Nov. 3, 1936 |
| 2,345,279 | Morehouse | Mar. 28, 1944 |
| 2,373,328 | Morehouse | Apr. 10, 1945 |